US012655651B2

(12) United States Patent
Zhou

(10) Patent No.: US 12,655,651 B2
(45) Date of Patent: Jun. 16, 2026

(54) REAR VEHICLE BUCKET EQUIPMENT CAPABLE OF LIFTING AND CARRYING ROOF TENT

(71) Applicant: Wild Land Outdoor Gear Ltd., Xiamen (CN)

(72) Inventor: Nanqing Zhou, Xiamen (CN)

(73) Assignee: WILD LAND OUTDOOR GEAR LTD., Xiamen (CN)

( * ) Notice: Subject to any disclaimer, the term of this patent is extended or adjusted under 35 U.S.C. 154(b) by 520 days.

(21) Appl. No.: 18/098,708

(22) Filed: Jan. 19, 2023

(65) Prior Publication Data

US 2023/0235590 A1 Jul. 27, 2023

(30) Foreign Application Priority Data

Jan. 26, 2022 (CN) .......................... 202220220223.9
Jan. 28, 2022 (CN) .......................... 202220235414.2

(51) Int. Cl.
*E04H 15/06* (2006.01)
*B60J 7/16* (2006.01)
*B60P 3/34* (2006.01)
*B66F 3/44* (2006.01)

(52) U.S. Cl.
CPC ............ *E04H 15/06* (2013.01); *B60J 7/1614* (2013.01); *B60P 3/34* (2013.01); *B60P 3/341* (2013.01); *B66F 3/44* (2013.01)

(58) Field of Classification Search
CPC ........... E04H 15/06; B60J 7/1614; B60P 3/34; B60P 3/343; B60P 3/341
USPC ...... 296/160, 165, 173, 26.06, 26.07, 100.1, 296/100.08, 136.03
See application file for complete search history.

(56) References Cited

U.S. PATENT DOCUMENTS

| | | | | | |
|---|---|---|---|---|---|
| 2,729,497 | A | * | 1/1956 | Runyan ..................... | B60P 3/34 |
| | | | | | 254/122 |
| 5,016,858 | A | * | 5/1991 | Mitchell ................. | B66F 7/065 |
| | | | | | 296/26.07 |
| 5,366,266 | A | * | 11/1994 | Harbison ............... | B60J 7/1614 |
| | | | | | 296/165 |
| 5,423,587 | A | | 6/1995 | Ingram | |
| 6,658,798 | B1 | * | 12/2003 | Frerichs .............. | E04B 1/34305 |
| | | | | | 296/26.14 |

(Continued)

FOREIGN PATENT DOCUMENTS

| | | | |
|---|---|---|---|
| WO | 2014008473 A1 | 1/2014 |
| WO | 2018208778 A1 | 11/2018 |

OTHER PUBLICATIONS

First Office Action of the Australian application No. 2023200228, issued on May 23, 2024. 6 pages.

*Primary Examiner* — Jason S Morrow
(74) *Attorney, Agent, or Firm* — Syncoda LLC; Feng Ma

(57) ABSTRACT

Rear truck bed equipment capable of lifting and carrying a roof tent is provided. A lower side of a supporting assembly is used to be fixedly mounted on truck; bottom frame is fixedly mounted above the supporting assembly; a top frame is located above the bottom frame and is used to carry the roof tent; a lower end of a linear lifting mechanism is relatively fixed to the bottom frame, and an upper end is fixed to the top frame; and the linear lifting mechanism drives the top frame to rise such that the equipment is in an unfolded state, or drives the top frame to fall such that the equipment is in a folded state.

19 Claims, 15 Drawing Sheets

(56) References Cited

U.S. PATENT DOCUMENTS

| | | | |
|---|---|---|---|
| 6,679,541 B1 * | 1/2004 | Hanser | B60P 3/34 |
| | | | 296/26.14 |
| 6,749,252 B2 * | 6/2004 | Cervenka | B60P 3/341 |
| | | | 296/165 |
| 10,538,151 B2 * | 1/2020 | Sullivan | B60J 7/12 |
| 10,590,675 B2 * | 3/2020 | Zhou | E04H 15/008 |
| 10,596,951 B1 * | 3/2020 | Williams | B60J 7/1657 |
| 10,920,445 B2 * | 2/2021 | Montesalvo | E04H 15/06 |
| 11,225,187 B1 * | 1/2022 | Koehler | B60P 3/341 |
| 11,572,006 B2 * | 2/2023 | Tezza, II | B60P 3/343 |
| 11,623,699 B2 * | 4/2023 | Mansell | E04H 15/06 |
| | | | 224/405 |
| 11,691,570 B2 * | 7/2023 | Perkins | B60P 3/341 |
| | | | 224/320 |
| 11,865,906 B2 * | 1/2024 | Scammell | B60R 9/06 |
| 11,926,253 B1 * | 3/2024 | Thompson | B60P 3/34 |
| 12,017,519 B2 * | 6/2024 | Facchinello | B60J 7/1614 |
| 12,018,503 B2 * | 6/2024 | Davis | B60P 3/38 |
| 12,214,712 B1 * | 2/2025 | Andrews | E04H 15/06 |
| 2002/0109374 A1 | 8/2002 | Cargill | |
| 2010/0186309 A1 * | 7/2010 | Hawkins | E04B 1/3445 |
| | | | 52/79.5 |
| 2015/0291017 A1 * | 10/2015 | LaBiche | B60J 7/1204 |
| | | | 296/100.1 |
| 2019/0061497 A1 | 2/2019 | Trinier | |
| 2022/0250455 A1 * | 8/2022 | Trinier | B60J 7/1614 |
| 2024/0140181 A1 * | 5/2024 | Ye | B60R 9/045 |
| 2024/0308312 A1 * | 9/2024 | Gravdahl | B60J 7/1614 |
| 2024/0426130 A1 * | 12/2024 | Smart | E06C 1/387 |
| 2025/0067080 A1 * | 2/2025 | Kasteleiner | E04H 15/20 |

* cited by examiner

A

23

21

B

REAR VEHICLE BUCKET EQUIPMENT CAPABLE OF LIFTING AND CARRYING ROOF TENT

TECHNICAL FIELD

The present invention relates to vehicle equipment, in particular to rear truck bed equipment capable of lifting and carrying a roof tent, which is suitable for mounting on a rear truck bed of a pickup truck and other vehicles.

BACKGROUND

Usually, pickup trucks and other vehicles do not have specially configured luggage carriers, so it is very inconvenient to carry luggage and other goods; the luggage is generally fixed by means of rope binding, and thus loading and unloading operations are troublesome, time-consuming and laborious; and in addition, the luggage often slips due to insecure fixation.

Some owners may refit the vehicles and add fixed enclosed cargo compartments to rear truck beds to carry the luggage; however, there are many problems in refitting: firstly, when the vehicles are to be refitted, the owners need to apply and report for approval, and the procedures are troublesome; secondly, such cargo compartments consume a lot of materials and the refitting costs are high; thirdly, the refitted cargo compartments are fixed and cannot be disassembled at will, and sizes and heights of the cargo compartments cannot be adjusted at will; and fourthly, once the vehicles are refitted, if the cargo compartments are to be removed, the owners still need to apply and report for approval. In view of the multiple problems of the refitted vehicles, refitting of the vehicles is not common in practice. Besides, roof tents generally cannot be mounted on such vehicles having the rear truck beds and thus the owners cannot have experiences of roof camping in the wild.

Then, the problem that is expected, by operators and the owners, to be solved is how to conveniently carry the luggage on the rear truck beds of the pickup trucks and other vehicles and enable the owners to have their own roof tents.

SUMMARY

The present invention aims to provide rear truck bed equipment capable of lifting and carrying a roof tent, the equipment is very convenient to mount, dismount and lift, then luggage can be loaded and fixed in a rear truck bed of a truck conveniently, and the roof tent can be mounted conveniently.

In order to achieve the purposes above, the following solutions of the present invention are provided.

The rear truck bed equipment capable of lifting and carrying the roof tent comprises a supporting assembly, a bottom frame, a linear lifting mechanism and a top frame, wherein a lower side of the supporting assembly is used to be fixedly mounted on a truck; the bottom frame is fixedly mounted above the supporting assembly; the top frame for carrying the roof tent is located above the bottom frame; a lower end of the linear lifting mechanism is relatively fixed to the bottom frame, and an upper end of the linear lifting mechanism is fixed to the top frame; and the linear lifting mechanism rises and falls to drive the top frame to rise to get away from the bottom frame such that the equipment is in an unfolded state, or to drive the top frame to fall to overlap the bottom frame such that the equipment is in a folded state.

The top frame is used as a bottom of the roof tent to be integrated with the roof tent.

The linear lifting mechanism is a linear lifting motor, the linear lifting motor is relatively fixed to the bottom frame (the linear lifting motor may be directly fixed to the bottom frame, or may be fixed to other appropriate positions to be relatively fixed to the bottom frame), and an upper end of a lifting rod of the linear lifting motor is fixed to the top frame. Or the linear lifting mechanism is a telescopic pipe, a lower end of the telescopic pipe is relatively fixed to the bottom frame (the lower end may be directly fixed to the bottom frame, or may be fixed to other appropriate positions to be relatively fixed to the bottom frame), and an upper end of the telescopic pipe is fixed to the top frame. One or more linear lifting motors and telescopic pipes may be provided, and lifting guide pipes are further arranged between the bottom frame and the top frame so as to guarantee the stability of the lifting movement.

The linear lifting mechanism is a scissor type lifting frame; a lower end of the scissor type lifting frame is pivotally connected to lower pivot points of the bottom frame such that the scissor type lifting frame is fixedly mounted on the bottom frame, and an upper end of the scissor type lifting frame is pivotally connected to upper pivot points of the top frame such that the top frame is fixedly mounted on the scissor type lifting frame; at least one of the lower pivot points of the bottom frame is movable, and at least one of the upper pivot points of the top frame is movable; at least one of the movable lower pivot point of the bottom frame and the movable upper pivot point of the top frame is fixed to an output end of an electric push rod; the output end of the electric push rod is in transmission connection with the movable upper pivot point or the movable lower pivot point to drive the scissor type lifting frame to rise and fall so as to drive the top frame to rise or fall to overlap the bottom frame. The scissor type lifting frame comprises a left scissor structure and a right scissor structure.

The bottom frame comprises two driving pipes and two bottom frame cross bars; each driving pipe has a movable lower pivot point and a fixed lower pivot point, and a lower sliding groove is formed in an inner side of the driving pipe; and one electric push rod is mounted in each driving pipe, a lower connecting rod is fixed to the output end of the electric push rod, the lower connecting rod extends out of the lower sliding groove to form the movable lower pivot point, and guide bearings are mounted on the lower connecting rod. Further, each of the lower connecting rods is provided with a U-shaped guide bearing and a rubber-coated flat guide bearing respectively on two sides of the output end of the electric push rod, an upper and lower rail is arranged in each of the driving pipes, and the U-shaped guide bearing matches the upper and lower rail, so that the output end of the electric push rod moves stably in the driving pipe.

The top frame comprises two driven pipes, two top frame cross bars and a plurality of top frame bearing bars; each driven pipe has a movable upper pivot point and a fixed upper pivot point, and an upper sliding groove is formed in an inner side of the driven pipe; a sliding plate is arranged in each driven pipe, an upper connecting rod is fixed to the sliding plate, the upper connecting rod extends out of the upper sliding groove to form the movable upper pivot point, and guide bearings are mounted on the sliding plate; and the top frame bearing bars are fixed between the front and rear top frame cross bars by means of top frame connectors. Further, the guide bearings on each of the sliding plates are U-shaped guide bearings, a left and right rail is arranged in each of the driven pipes, and the U-shaped guide bearings match the left and right rail, so that the sliding plate moves stably in the driven pipe.

The supporting assembly comprises a supporting frame and baffles; a lower edge of the supporting frame is fixedly mounted on the truck; and the baffles are mounted around the supporting frame. The baffles on left and right sides and at the back of the supporting frame are mounted on the supporting frame in such a form that the baffles can be turned outwards, windows are formed on the supporting frame after the baffles are turned outwards, and the baffles turned outwards form sills.

The supporting assembly comprises supporting legs and baffles; sleeves are provided above the supporting legs, mounting plates are provided below the sleeves, two ends of each of the bottom frame cross bars are inserted in the sleeves and are fixed, buffer blocks are arranged on the bottom frame cross bars or the sleeves, and two ends of each of the driving pipes are fixed to the mounting plates; two supporting legs are provided on each of left and right sides and are inclined from the left or right to the middle respectively; and the baffles are mounted on every two adjacent supporting legs respectively, or a storage box is mounted on the two rear supporting legs, and the baffles are mounted on every two adjacent ones of the remaining supporting legs. A spare tire holder is mounted on the storage box or the baffle on the two rear supporting legs. One edge of the storage box or the baffle on the two rear supporting legs is connected to the supporting legs by means of hinges. The baffles are mounted on the supporting legs in such a form that the baffles can be turned outwards, windows are formed between the supporting legs after the baffles are turned outwards, and the baffles turned outwards form sills.

Roller blinds are mounted between the top frame and the bottom frame, are unfolded when the equipment rises, are provided with entrances and exits, and are rolled when the equipment falls.

A shed frame capable of extending outwards is mounted on an edge of the top frame and is used to mount a shed cloth.

After the above solutions are adopted, the equipment can be very conveniently fixedly mounted on the rear truck bed of the truck by means of the supporting assembly and can also be very conveniently dismounted after being mounted; and in addition, the equipment can rise or fall vertically by means of the linear lifting mechanism, the roof tent can be conveniently mounted on the top frame of the equipment, and the top frame can also be conveniently used to store the luggage after the roof tent is removed. The space of the rear truck bed of the truck can be expanded after the equipment rises, and thus articles can be stored conveniently. The equipment can also be designed to be able to rise to the sufficient height such that an adult can normally stand below the equipment, and then the rear truck bed of the truck can be a temporary housing for camping in the wild and be a temporary activity space for relaxation, entertainment or study. After the equipment falls and rises, the roof tent can be unfolded to provide another kind of rest space for camping in the wild, and thus the owner of the truck, such as a pickup truck, provided with the rear truck bed can also have the experience of roof camping in the wild.

Figure 1:
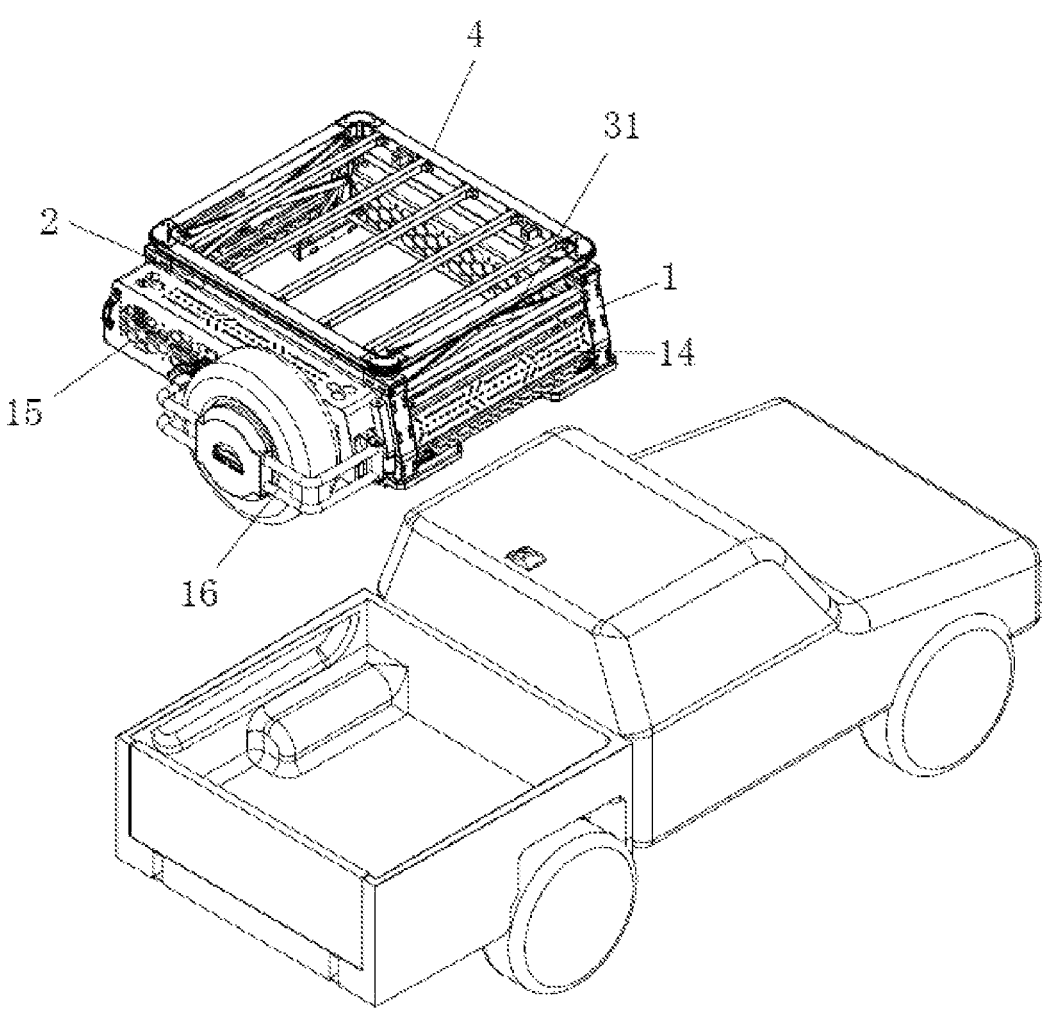
FIG. 1 is an exploded view after matching of the present invention and a pickup truck.
Figure 2:
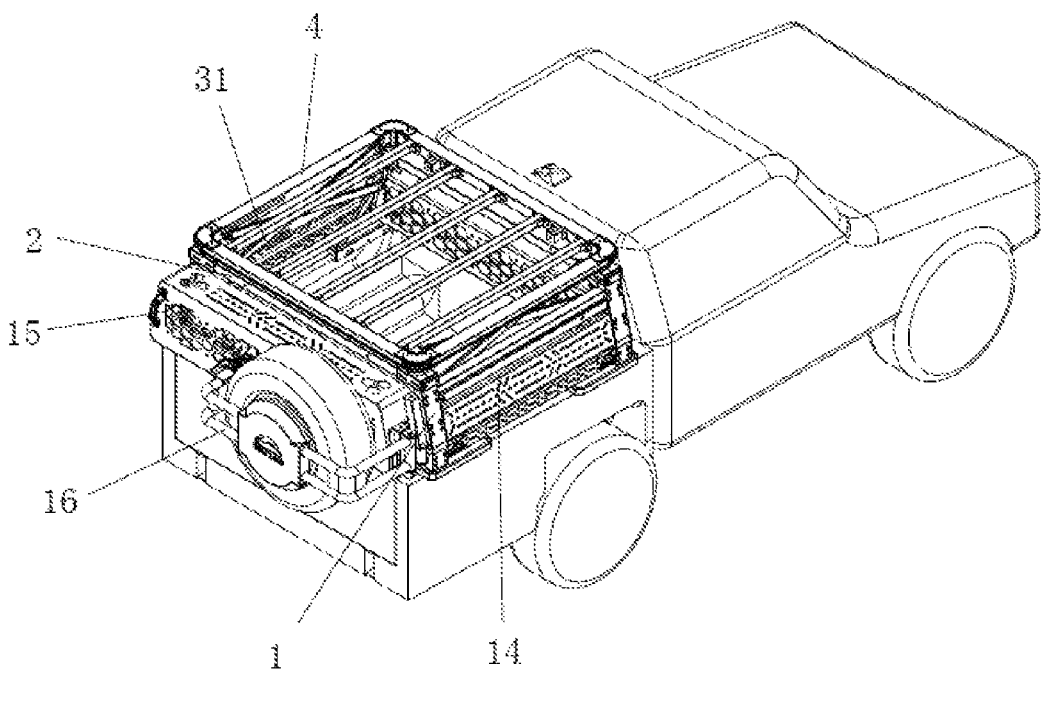
FIG. 2 is a schematic diagram of a folded state after loading of the present invention.
Figure 3:
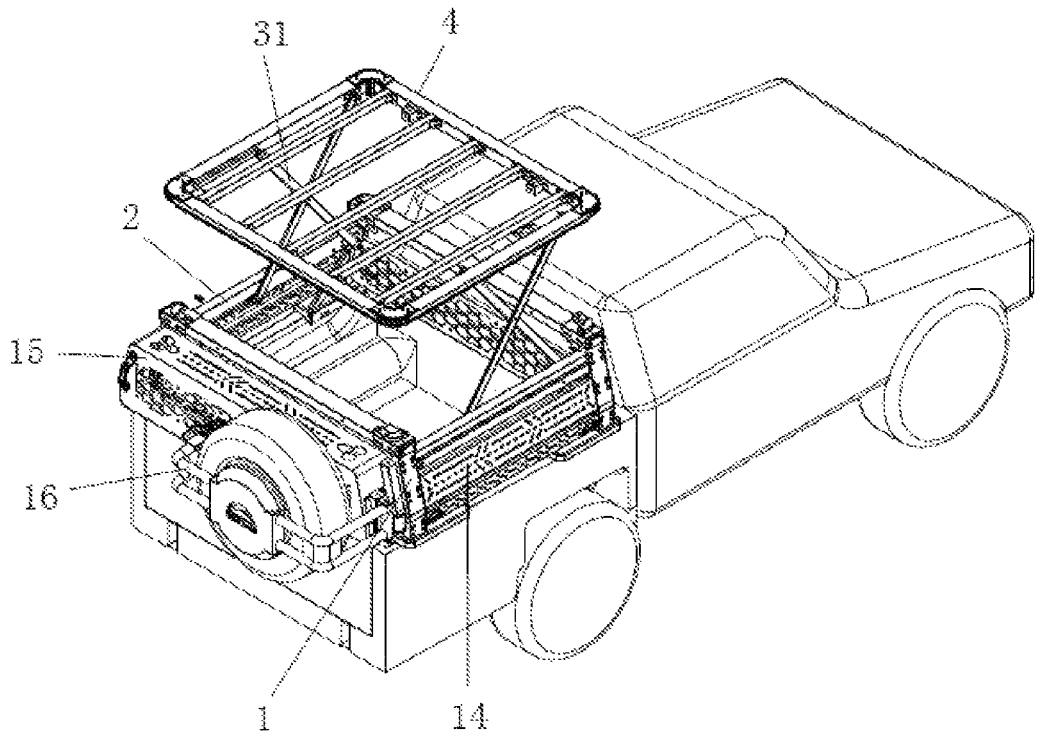
FIG. 3 is a schematic diagram of an unfolded state after loading of the present invention.
Figure 4:
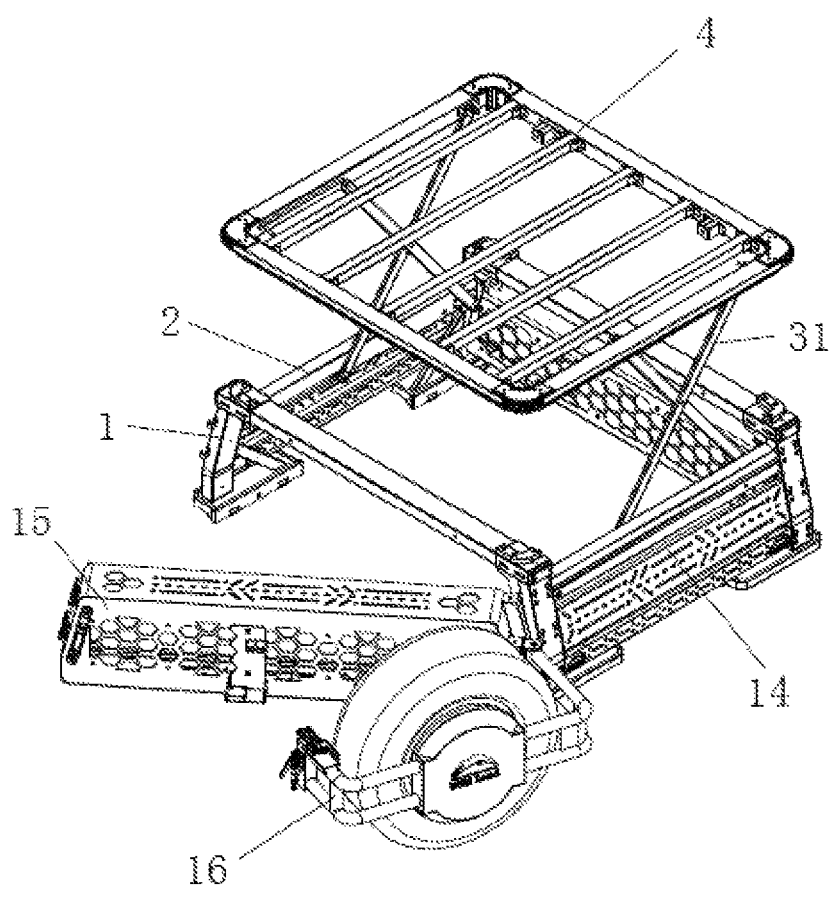
FIG. 4 is an unfolded use state diagram of the present invention.

DESCRIPTION OF REFERENCE NUMERALS roof tent 100;

supporting assembly 10, supporting leg 1, sleeve 11, mounting plate 12, buffer block 13, baffle 14, upper baffle 141, lower baffle 142, storage box 15, spare tire holder 16, inserting plate 17, contour warning mark 18, supporting frame 19, and fixing member 191;

bottom frame 2, driving pipe 21, upper and lower rail 211, bottom frame cross bar 22, and lower sliding groove 23;

scissor type lifting frame 31, linear lifting motor 32, and lifting guide pipe 33;

top frame 4, driven pipe 41, top frame cross bar 42, top frame bearing bar 43, top frame connector 431, upper sliding groove 44, sliding plate 45, upper connecting rod 46, guide bearing 47, and left and right rail 48;

electric push rod 5, lower connecting rod 51, and guide bearings 52, 53;

anti-theft base 6, inserting groove 61, movable side door plank 62, keyhole 63, and threaded hole 64; and lower pivot points A/B, and upper pivot points C/D.

DESCRIPTION OF EMBODIMENTS

The present invention is further described in detail in conjunction with the accompanying drawings and particular embodiments below.

Figure 15:
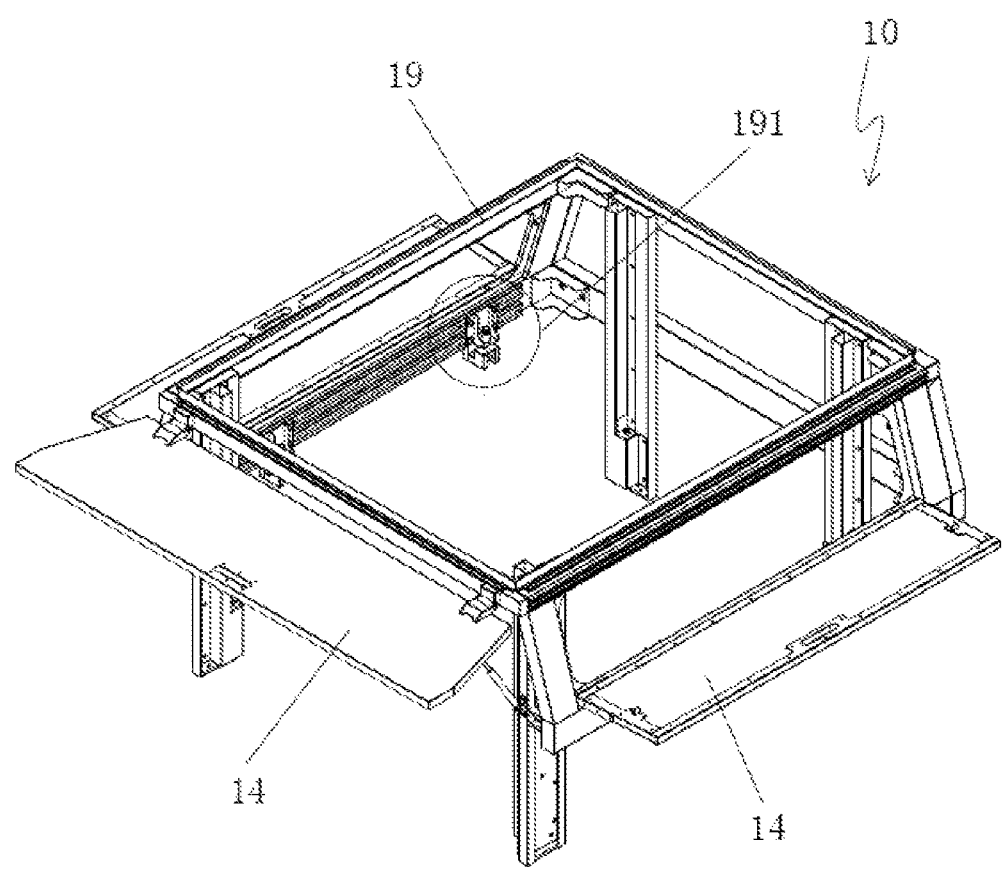
FIG. 15 is a structure diagram of a supporting assembly of another embodiment of the present invention.

As shown in FIG. 1 to FIG. 14, rear truck bed equipment capable of lifting and carrying a roof tent comprises a supporting assembly, a bottom frame 2, a linear lifting mechanism and a top frame 4.

a lower side of the supporting assembly 10 is used to be fixedly mounted on a truck, and the whole equipment can be very conveniently fixedly mounted on the truck (such as a rear truck bed) by means of fixing ends (such as inserting plates 17) on the lower side of the supporting assembly 10 or other accessories (such as fixing members 191 as shown in FIG. 15), and can also be very conveniently dismounted after being mounted.

The bottom frame 2 is fixedly mounted above the supporting assembly 10.

The top frame 4 is located above the bottom frame 2 and is used to carry the roof tent 100, and the shape and the structure of the roof tent 100 are not limited by the figures. The top frame 4 as shown in the figures is used as a bottom of the roof tent 100 to be integrated with the roof tent 100.

A lower end of the linear lifting mechanism is relatively fixed to the bottom frame 2, and an upper end of the linear lifting mechanism is fixed to the top frame 4. The specific shape of the linear lifting mechanism can be determined according to design requirements, and all that is needed is to raise the top frame 4 from the bottom frame 2 or to descend the top frame 4 on the bottom frame 2. The linear lifting mechanism rises and falls to drive the top frame 4 to rise to get away from the bottom frame 2 such that the equipment is in an unfolded state, or to drive the top frame 4 to fall to overlap the bottom frame 2 such that the equipment is in a folded state.

The linear lifting mechanism is a scissor type lifting frame 31 in the preferred embodiments as shown in FIG. 1 to FIG. 11. A lower end of the scissor type lifting frame 31 is pivotally connected to lower pivot points A/B of the bottom frame 2 such that the scissor type lifting frame 31 is fixedly mounted on the bottom frame 2, an upper end of the scissor type lifting frame 31 is pivotally connected to upper pivot points C/D of the top frame 4 such that the top frame 4 is fixedly mounted on the scissor type lifting frame 31, and thus the top frame 4 is mounted on the bottom frame 2 by means of the scissor type lifting frame 31 in a rising and falling manner. The scissor type lifting frame 31 as shown in the figures comprises a left scissor structure and a right scissor structure, which can ensure the stable rising and falling of the top frame 4. At least one lower pivot point A of the lower pivot points A/B of the bottom frame 2 is movable, and at least one upper pivot point C of the upper pivot points C/D of the top frame 4 is movable. At least one of the movable lower pivot point A of the bottom frame 2 and the movable upper pivot point C of the top frame 4 is fixed to an output end of an electric push rod 5, the electric push rod 5 is mounted in the bottom frame 2 in the figures, and the lower pivot point A is fixed to the output end of the electric push rod 5. It should be noted that the electric push rod 5 can also be mounted in other appropriate positions and can also be replaced by a hydraulic push rod or other equivalent power sources, and these changes and replacements should be regarded as equivalent technologies.

During use of the present invention, the output end of the electric push rod 5 drives the movable lower pivot point A to slide actively and the movable upper pivot point C to slide passively to drive the scissor type lifting frame 31 to rise and fall so as to drive the top frame 4 to vertically rise or fall to overlap the bottom frame 2. Luggage can be conveniently stored on the top frame 4 of the present invention, and the roof tent 100 can also be conveniently mounted on the top frame. The space of the rear truck bed of the truck can be expanded after the equipment rises, and thus articles can be stored conveniently. The equipment can also be designed to rise such that an adult can normally stand below the equipment, and then the rear truck bed of the truck can be a temporary housing (such as a shed) for camping in the wild and be a temporary activity space for relaxation, entertainment or study. If the roof tent 100 is mounted on the top frame 4 of the present invention, the roof tent 100 can be folded or unfolded for use when the equipment rises; and after the equipment falls, the rear truck bed below the bottom frame 2 can be a safe and independent storage space, the roof tent 100 can also be unfolded to provide another kind of rest space for camping in the wild, and thus an owner of the truck, such as a pickup truck, provided with the rear truck bed can also have the experience of roof camping in the wild.

In the preferred embodiments of the present invention, the bottom frame 2 comprises two driving pipes 21 and two bottom frame cross bars 22. Each driving pipe 21 has the movable lower pivot point A and the fixed lower pivot point B, and a lower sliding groove 23 is formed in an inner side of the driving pipe 21. One electric push rod 5 is mounted in each driving pipe 21, a lower connecting rod 51 is perpendicularly fixed to the output end of the electric push rod 5 by means of a gasket and a nut, the lower connecting rod 51 extends out of the lower sliding groove 23 to form the movable lower pivot point A, and guide bearings 52, 53 are mounted on the lower connecting rod 51. In order to ensure the stability of the transmission, in the preferred embodiments, each of the lower connecting rods 51 is provided with a U-shaped guide bearing 52 and a rubber-coated flat guide bearing 53 respectively on two sides of the output end of the electric push rod 5, correspondingly, an upper and lower rail 211 is arranged in each of the driving pipes 21, and the U-shaped guide bearing 52 matches the upper and lower rail 211, so that the output end of the electric push rod 5 moves stably in the driving pipe 21, and the stability of the movement of the lower pivot point A and the scissor type lifting frame 31 is guaranteed.

In the preferred embodiments of the present invention, the top frame 4 comprises two driven pipes 41, two top frame cross bars 42 and a plurality of top frame bearing bars 43. Each driven pipe 41 has the movable upper pivot point C and the fixed upper pivot point D, and an upper sliding groove 44 is formed in an inner side of the driven pipe 41. A sliding plate 45 is arranged in each driven pipe 41, an upper connecting rod 46 is fixed to the sliding plate 45, the upper connecting rod 46 extends out of the upper sliding groove 44 to form the movable upper pivot point C, and guide bearings 47 are mounted on the sliding plate 45. In order to ensure the stability of the transmission, in the preferred embodiments, the guide bearings 47 on each of the sliding plates 45 are U-shaped guide bearings, correspondingly, a left and right rail 48 is arranged in each of the driven pipes 41, and the U-shaped guide bearings match the left and right rail 48, so that the sliding plate 45 moves stably in the driven pipe 41, and the stability of the movement of the upper pivot point C and the scissor type lifting frame 31 is guaranteed. The top frame bearing bars 43 are fixed between the front and rear top frame cross bars 42 by means of top frame connectors 431, which can facilitate carrying of the luggage, can facilitate mounting of the roof tent 100, and can also directly replace the top frame 4 with the bottom of the roof tent 100.

Figure 5:
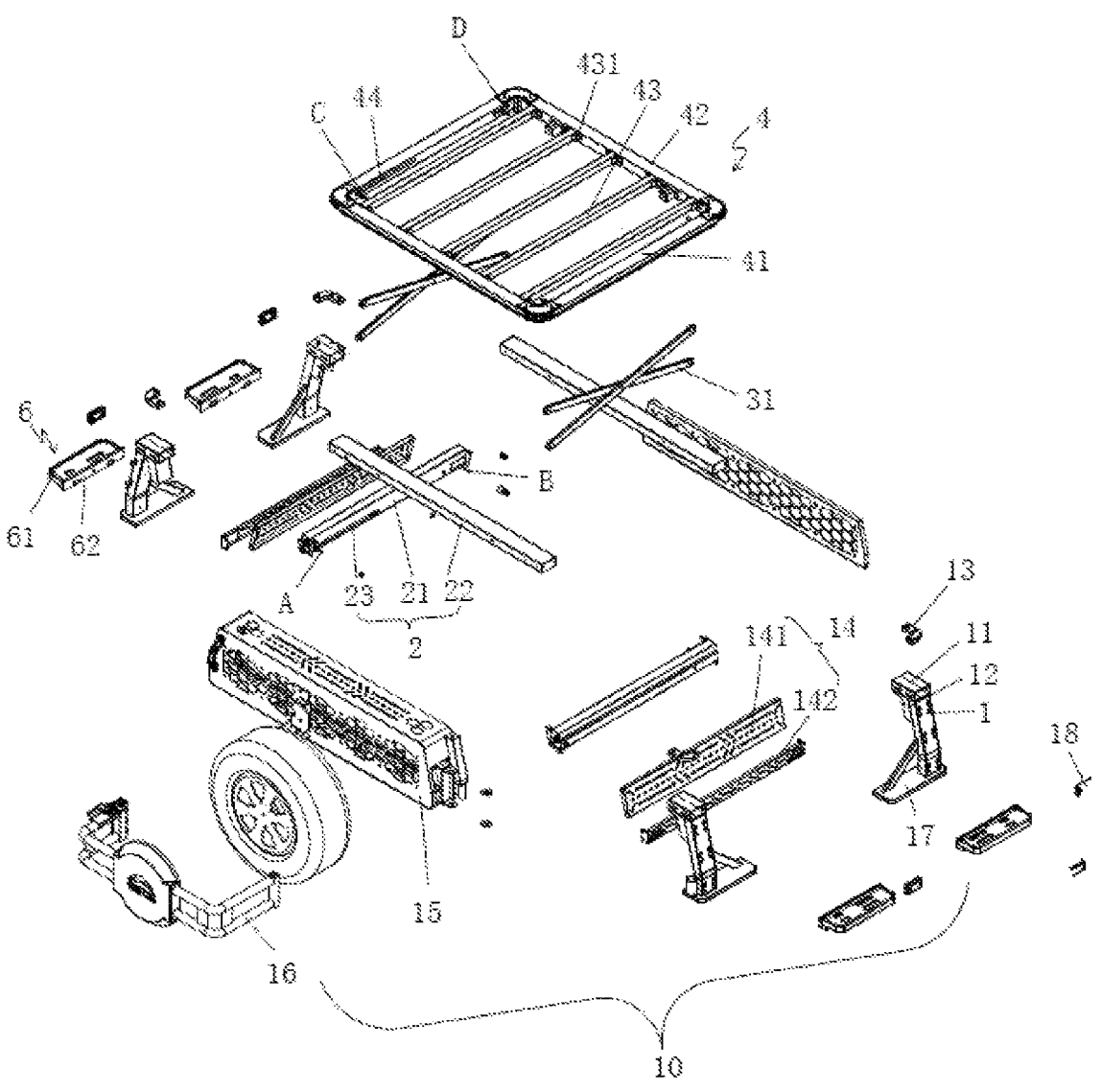
FIG. 5 is a three-dimensional exploded view of the present invention.
Figure 6:
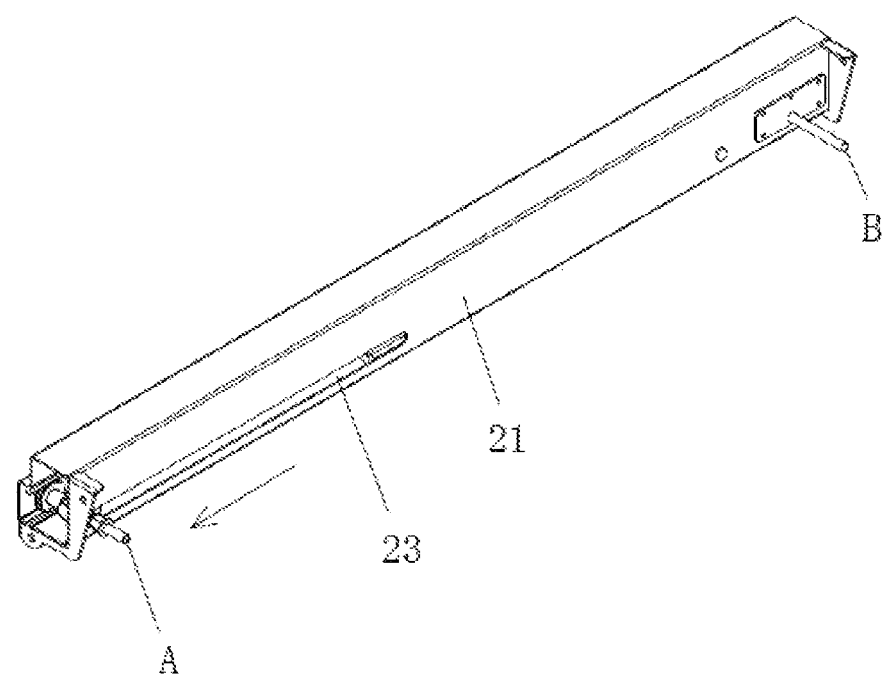
FIG. 6 is a propping state diagram of a driving pipe of a bottom frame.
Figure 7:
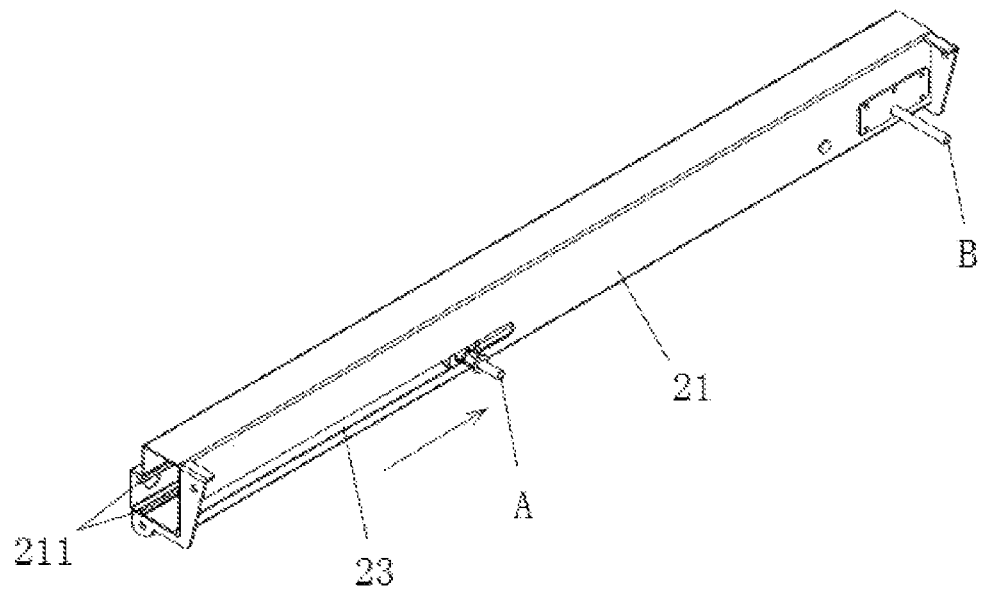
FIG. 7 is a contraction state diagram of the driving pipe of the bottom frame.
Figure 8:
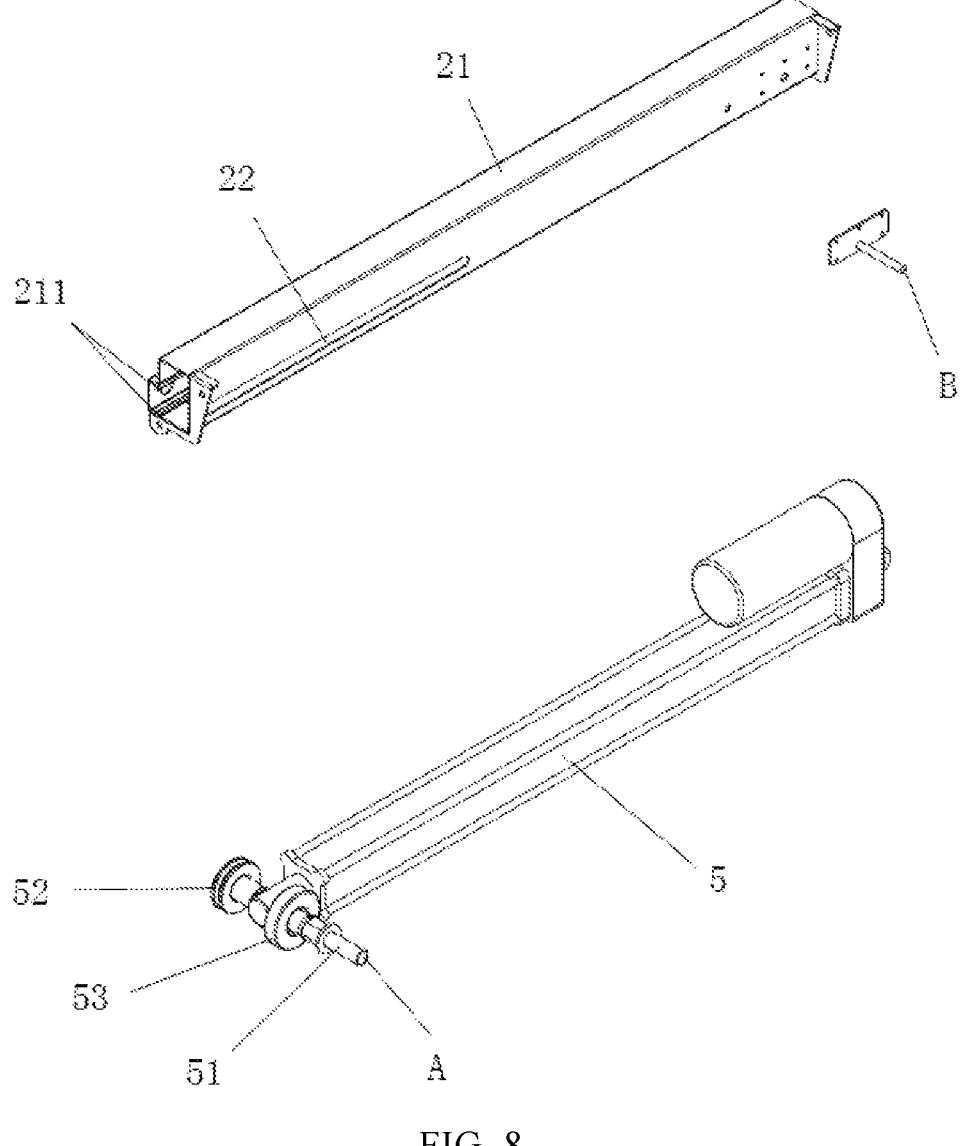
FIG. 8 is an exploded view of the driving pipe of the bottom frame.
Figure 9:
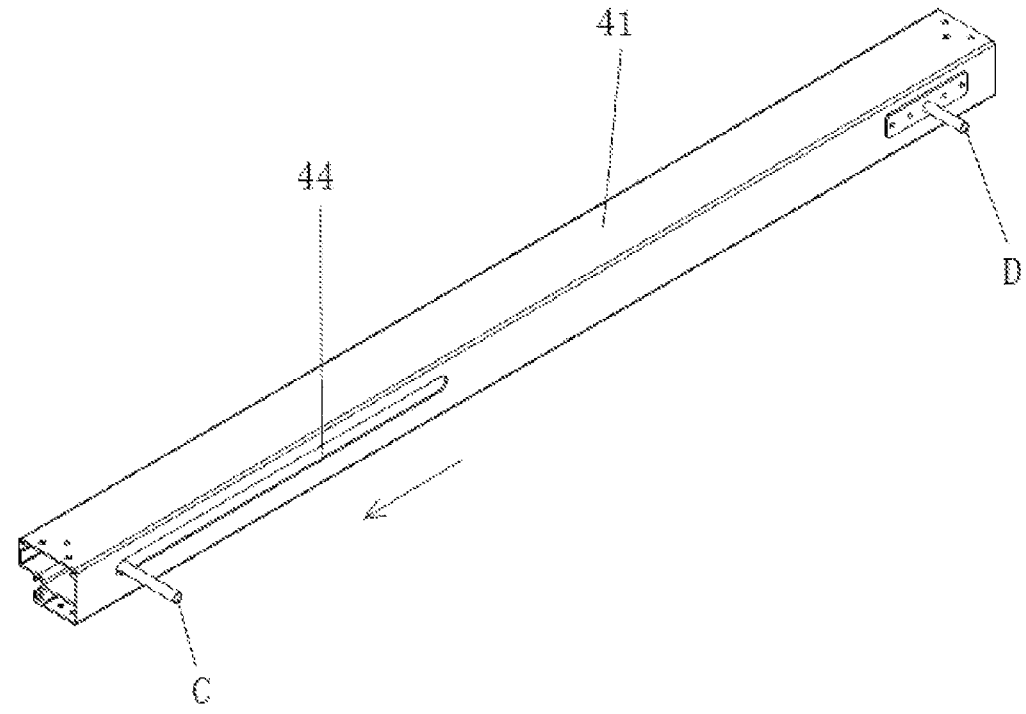
FIG. 9 is a propping state diagram of a driven pipe of a top frame.
Figure 10:
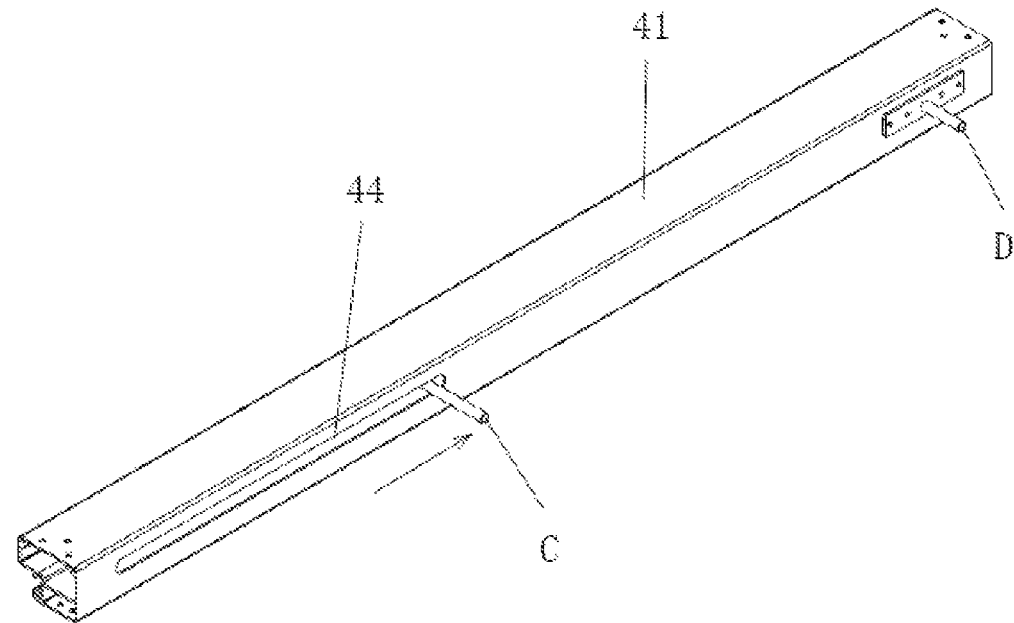
FIG. 10 is a contraction state diagram of the driven pipe of the top frame.
Figure 11:
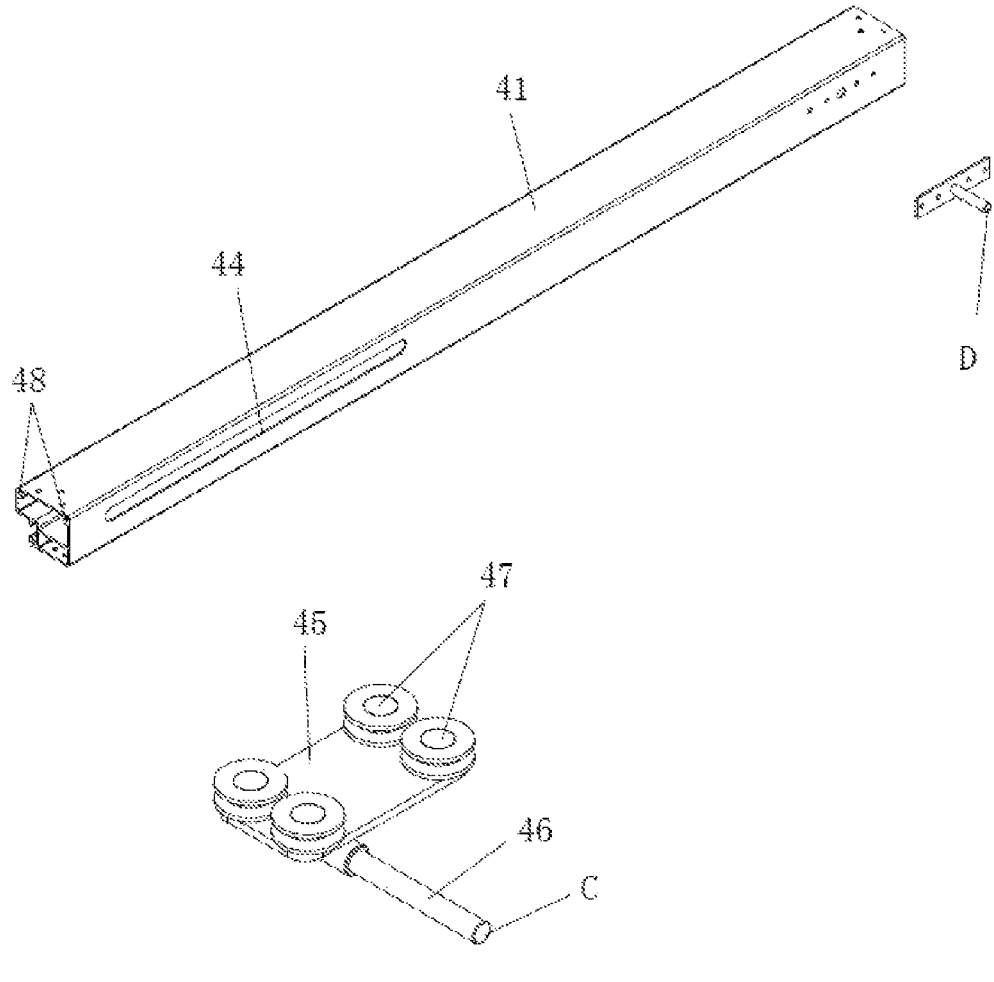
FIG. 11 is an exploded view of the driven pipe of the top frame.
Figure 12:
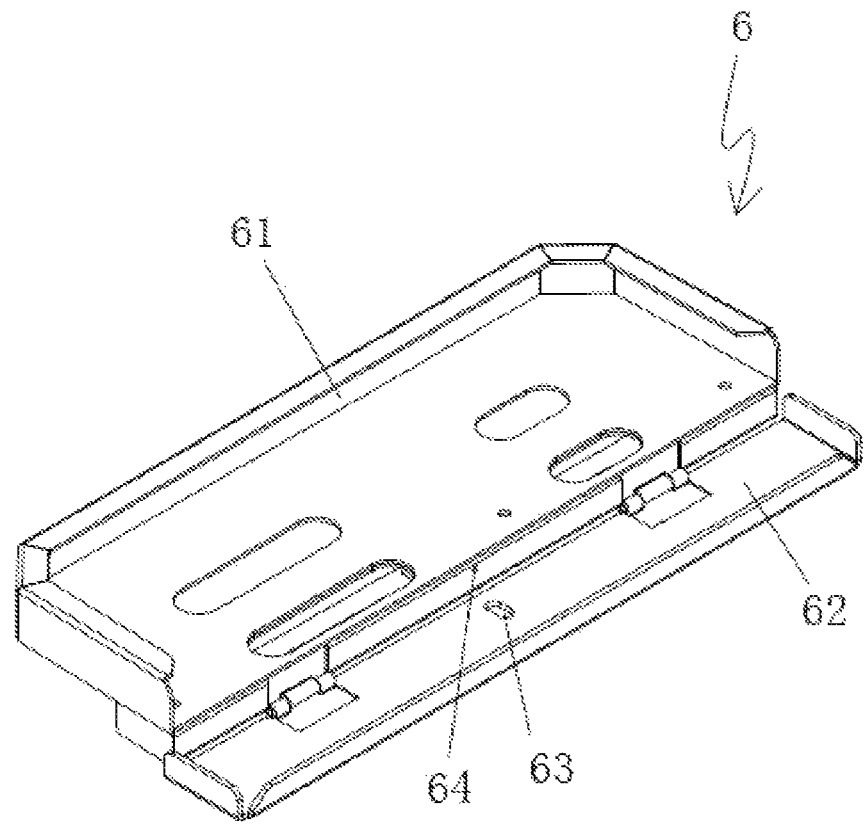
FIG. 12 is a structure diagram of an anti-theft base.

The specific structure of the supporting assembly 10 of the present invention may be as shown in the figures, but is not limited to structures as shown in the figures. In FIG. 5, the supporting assembly 10 comprises supporting legs 1 and baffles 14. Sleeves 11 are provided above the supporting legs 1, mounting plates 12 are provided below the sleeves 11, two ends of each of the bottom frame cross bars 22 are inserted in the sleeves 11 and are fixed by means of bolts, buffer blocks 13 are arranged on the bottom frame cross bars 22 or the sleeves 11, and two ends of each of the driving pipes 21 are fixed to the mounting plates 12 by means of bolts. In this way, there is a drop height between the driving pipes 21 and the bottom frame cross bars 22, the scissor type lifting frame 31 can be stored when the equipment is folded, and the buffer blocks 13 can prevent the impact caused by the top frame 4 on the bottom frame 2 during falling. In addition, the contour warning marks 18 can also be mounted on left and right sides of the present invention so as to improve the safety of vehicle driving.

Two supporting legs 1 are provided on each of left and right sides, there are four supporting legs in total, and the supporting legs are inclined from the left or right to the middle respectively; the baffles 14 are mounted on every two adjacent supporting legs 1 respectively, or a storage box 15 is mounted on the two rear supporting legs, and the baffles 14 are mounted on every two adjacent ones of the remaining supporting legs 1; and the baffle 14 on the two supporting legs 1 on each of the left and right sides can be divided into two pieces (including an upper baffle 141 and a lower baffle 142) to facilitate mounting. A spare tire holder 16 can be mounted on the storage box 15 (or the baffle) on the two rear supporting legs 1.

One edge or a top edge of the storage box 15 (or the baffle) on the two rear supporting legs 1 can also be connected to the supporting legs 1 by means of hinges, so that storage box 15 (or the baffle) can be opened conveniently, and then a user can enter and leave the space below the equipment conveniently. Further, the baffles 14 can be designed to be able to be turned outwards and are mounted on the supporting legs 1, windows are formed between the supporting legs 1 after the baffles 14 are turned outwards, and the baffles 14 turned outwards can form large sills which can be used as bar counters or other fitting platforms.

The fixing ends of the supporting legs 1 are the inserting plates 17; and anti-theft bases 6 are further provided below the supporting legs 1. Inserting grooves 61 and inserting openings are formed in top surfaces of the anti-theft bases 6, and movable side door planks 62 are mounted in the inserting openings. During mounting, the anti-theft bases 6 can be fixed to edges of side plates of the rear truck bed of the truck firstly, then the inserting plates 17 are inserted into the inserting grooves 61 via the inserting openings of the anti-theft bases 6, and the inserting plates 17 are fixed to the anti-theft bases 6 by means of limiting by the movable side door planks 62. Further, the movable side door planks 62 are provided with keyholes 63, the anti-theft bases 6 are correspondingly provided with threaded holes 64, triangular anti-theft screws are mounted in the keyholes 63 and the threaded holes 64, the movable side door planks 62 are fixed and limited by means of the triangular anti-theft screws, and thus the inserting plates 17 are locked on the anti-theft bases 6 to achieve the anti-theft effect.

In addition to structures as shown in the figures, the supporting assembly 10 of the present invention may also be of other structures. For example, as shown in FIG. 15, the supporting assembly 10 comprises a supporting frame 19 and baffles 14. A lower edge of the supporting frame 19 can be fixedly mounted on the truck, by means of the fixing members 191, and the baffles 14 are mounted around the supporting frame 19. The baffles 14 on left and right sides and at the back of the supporting frame 19 are mounted on the supporting frame in such a form that the baffles can be turned outwards, windows are formed on the supporting frame 19 after the baffles 14 are turned outwards, and the baffles 14 turned outwards form sills.

Further, electric roller blinds can be mounted between the top frame 4 and the bottom frame 2 of the present invention, and the roller blinds are unfolded when the equipment rises, are provided with entrances and exits, and are rolled when the equipment falls. The roller blinds can enclose the space below the top frame 4 when the equipment is unfolded, thereby providing a more private and comfortable personal space. A shed frame capable of extending outwards can also be mounted on an edge of the top frame 4, and when the top frame 4 rises, a shed cloth can be mounted on the shed frame so as to form a large shed which provides a comfortable rest space for people and even can completely cover the whole truck to keep out wind and rain for the whole truck.

Figure 13:
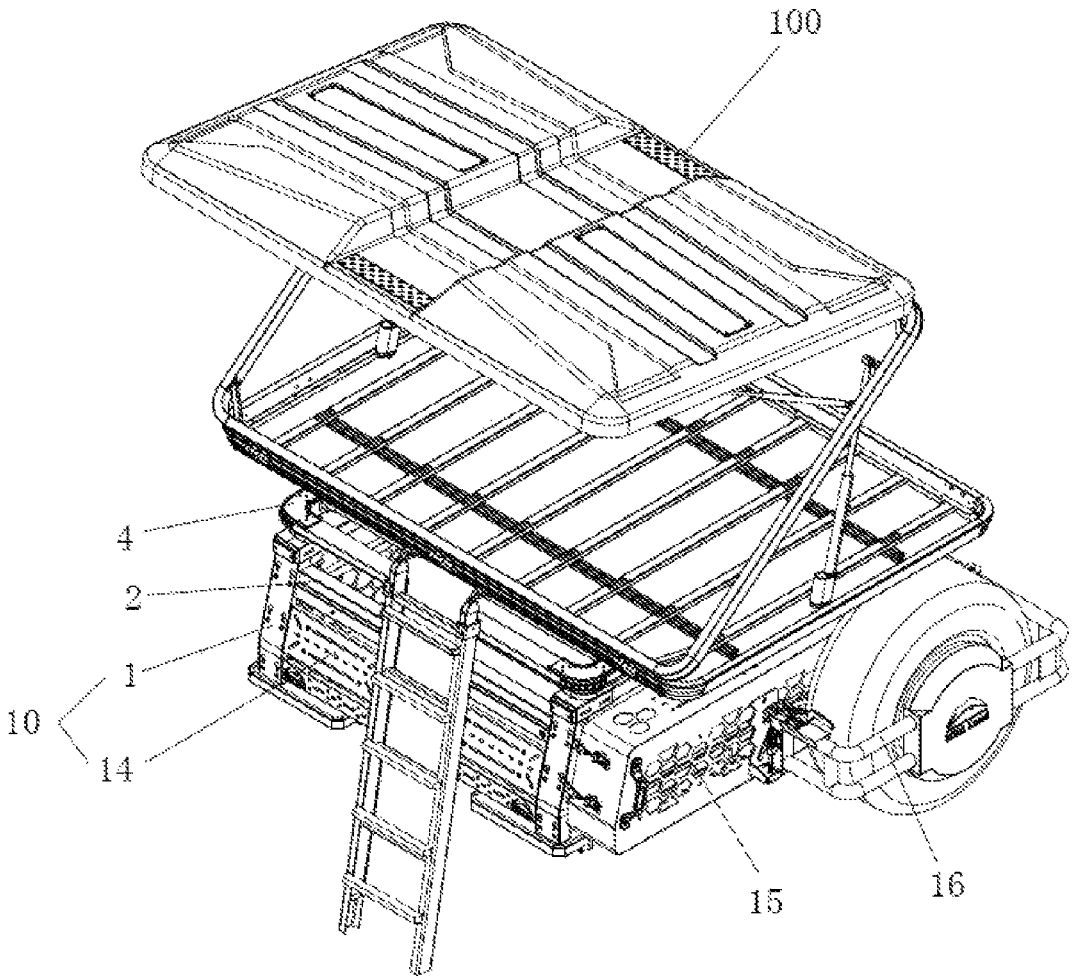
FIG. 13 is a schematic diagram of the present invention carrying a roof tent.
Figure 14:
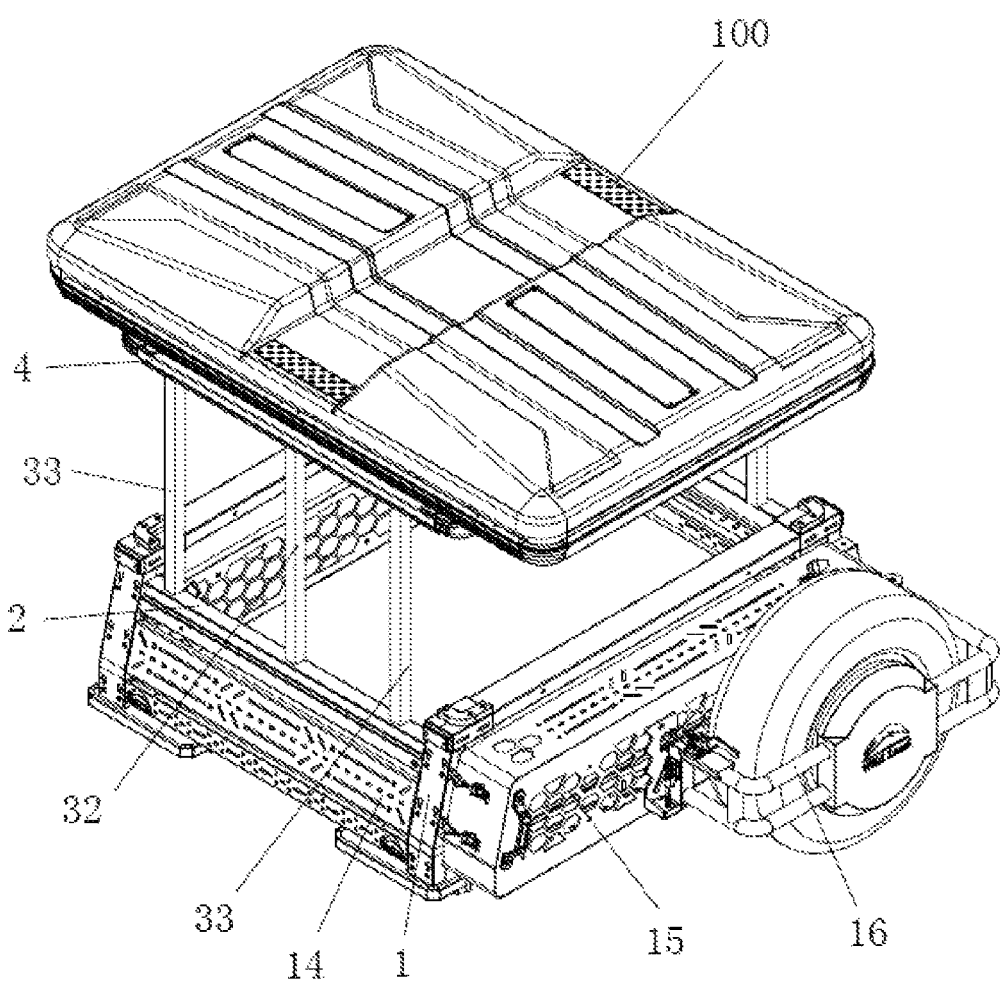
FIG. 14 is a structure diagram of another embodiment of the present invention.

Another preferred embodiment of the present invention is as shown in FIG. 13, the linear lifting mechanism is a linear lifting motor 32, and the linear lifting motor 32 is used to replace the scissor type lifting frame 31 of the above-mentioned embodiment. The linear lifting motor 32 is relatively fixed to the bottom frame 2, that is, the linear lifting motor 32 may be directly fixed to the bottom frame 2, or the linear lifting motor 32 may be fixed to other appropriate positions to be relatively fixed to the bottom frame 2. An upper end of a lifting rod of the linear lifting motor 32 is fixed to the top frame 4. Thus, the linear lifting motor 32 can rise and fall to drive the top frame 4 to rise to get away from the bottom frame 2 such that the equipment is in an unfolded state, or to drive the top frame 4 to fall to overlap the bottom frame 2 such that the equipment is in a folded state. One or more linear lifting motors 32 may be provided, lifting guide pipes 33 are further arranged between the bottom frame 2 and the top frame 4 so as to guarantee the stability of the lifting movement, and when the linear lifting motors 32 drives the top frame 4 to rise or fall, the lifting guide pipes 33 may play a guide role to avoid deviation. Of course, the linear lifting motors 32 may also be replaced by telescopic pipes, which will not be repeated here.

The above embodiments are only the particular embodiments of the present invention, and do not limit the scope of protection of the present invention. It should be noted that equivalent changes made by those skilled in the art according to the design thought of the present invention after reading this specification should fall within the scope of protection of the present invention.

The invention claimed is:

1. Rear truck bed equipment capable of lifting and carrying a roof tent, comprising a supporting assembly, a bottom frame, a linear lifting mechanism and a top frame, wherein a lower side of the supporting assembly is used to be fixedly mounted on a truck; the bottom frame is fixedly mounted above the supporting assembly; the top frame for carrying the roof tent is located above the bottom frame; a lower end of the linear lifting mechanism is relatively fixed to the bottom frame, and an upper end of the linear lifting mechanism is fixed to the top frame; and the linear lifting mechanism rises and falls to drive the top frame to rise to get away from the bottom frame such that the equipment is in an unfolded state, or to drive the top frame to fall to overlap the bottom frame such that the equipment is in a folded state.

2. The equipment according to claim 1, wherein the top frame is used as a bottom of the roof tent to be integrated with the roof tent.

3. The equipment according to claim 1, wherein the linear lifting mechanism is a linear lifting motor which is relatively fixed to the bottom frame, and an upper end of a lifting rod of the linear lifting motor is fixed to the top frame.

4. The equipment according to claim 1, wherein the linear lifting mechanism is a scissor type lifting frame; a lower end of the scissor type lifting frame is pivotally connected to lower pivot points of the bottom frame such that the scissor type lifting frame is fixedly mounted on the bottom frame, and an upper end of the scissor type lifting frame is pivotally connected to upper pivot points of the top frame such that the top frame is fixedly mounted on the scissor type lifting frame; at least one of the lower pivot points of the bottom frame is movable, and at least one of the upper pivot points of the top frame is movable; at least one of the movable lower pivot point of the bottom frame and the movable upper pivot point of the top frame is fixed to an output end of an electric push rod; the output end of the electric push rod is in transmission connection with the movable upper pivot point or the movable lower pivot point to drive the scissor type lifting frame to rise and fall so as to drive the top frame to rise or fall to overlap the bottom frame.

5. The equipment according to claim 4, wherein the bottom frame comprises two driving pipes and two bottom frame cross bars; each driving pipe has a movable lower pivot point and a fixed lower pivot point, and a lower sliding groove is formed in an inner side of the driving pipe; and one electric push rod is mounted in each driving pipe, a lower connecting rod is fixed to the output end of the electric push rod, the lower connecting rod extends out of the lower sliding groove to form the movable lower pivot point, and guide bearings are mounted on the lower connecting rod.

6. The equipment according to claim 5, wherein the supporting assembly comprises supporting legs and baffles; and sleeves are provided above the supporting legs, mounting plates are provided below the sleeves, two ends of each of the bottom frame cross bars are inserted in the sleeves and are fixed, buffer blocks are arranged on the bottom frame cross bars or the sleeves, and two ends of each of the driving pipes are fixed to the mounting plates.

7. The equipment according to claim 6, wherein two supporting legs are provided on each of left and right sides and are inclined from the left or right to the middle respectively; the baffles are mounted on every two adjacent supporting legs respectively, or a storage box is mounted on the two rear supporting legs, and the baffles are mounted on every two adjacent ones of the remaining supporting legs; and one edge of the storage box or the baffle on the two rear supporting legs is connected to the supporting legs by means of hinges.

8. The equipment according to claim 7, wherein the baffles are mounted on the supporting legs in such a form that the baffles can be turned outwards, windows are formed between the supporting legs after the baffles are turned outwards, and the baffles turned outwards form sills.

9. The equipment according to claim 4, wherein the top frame comprises two driven pipes, two top frame cross bars and a plurality of top frame bearing bars; each driven pipe has a movable upper pivot point and a fixed upper pivot point, and an upper sliding groove is formed in an inner side of the driven pipe; a sliding plate is arranged in each driven pipe, an upper connecting rod is fixed to the sliding plate, the upper connecting rod extends out of the upper sliding groove to form the movable upper pivot point, and guide bearings are mounted on the sliding plate; and the top frame bearing bars are fixed between the front and rear top frame cross bars by means of top frame connectors.

10. The equipment according to claim 1, wherein the supporting assembly comprises a supporting frame and baffles; a lower edge of the supporting frame is fixedly mounted on the truck; and the baffles are mounted around the supporting frame.

11. The equipment according to claim 10, wherein the baffles on left and right sides and at the back of the supporting frame are mounted on the supporting frame in such a form that the baffles can be turned outwards, windows are formed on the supporting frame after the baffles are turned outwards, and the baffles turned outwards form sills.

12. Rear truck bed equipment, comprising a supporting assembly, a bottom frame, a driving mechanism and a top frame, wherein a lower side of the supporting assembly is fixedly mounted on a truck, the bottom frame is fixedly mounted above the supporting assembly, the top frame is located above the bottom frame, the top frame is configured to carry a roof tent, the driving mechanism is configured to drive the top frame to move relative to the bottom frame such that the equipment is switched between an unfolded state and a folded state, the supporting assembly comprises inserting plates, the equipment comprises anti-theft bases, the anti-theft bases are fixed to a rear truck bed of the truck, inserting grooves and inserting openings are formed in top surfaces of the anti-theft bases, and the inserting plates are inserted into the inserting grooves via the inserting openings.

13. The rear truck bed equipment according to claim 12, wherein the driving mechanism comprises a linear lifting mechanism, and the linear lifting mechanism is configured to drive the top frame to rise to get away from the bottom frame such that the equipment is in the unfolded state, or to drive the top frame to fall to overlap the bottom frame such that the equipment is in the folded state.

14. The rear truck bed equipment according to claim 12, wherein the top frame is integrated with the roof tent, or the top frame is detachably connected to the roof tent.

15. The rear truck bed equipment according to claim 12, wherein the top frame comprises two top frame cross bars and a plurality of top frame bearing bars arranged between the two top frame cross bars, and the plurality of top frame bearing bars are configured to be connected to the roof tent.

16. The rear truck bed equipment according to claim 12, wherein the supporting assembly is fixed to edges of side plates of a rear truck bed of the truck.

17. Rear truck bed equipment, comprising a supporting assembly, a bottom frame, a driving mechanism and a top frame, wherein a lower side of the supporting assembly is fixedly mounted on a truck, the bottom frame is fixedly mounted above the supporting assembly, the top frame is located above the bottom frame, the top frame is configured to carry a roof tent, the driving mechanism is configured to drive the top frame to move relative to the bottom frame such that the equipment is switched between an unfolded state and a folded state, the supporting assembly comprises a supporting frame, the supporting frame is fixedly mounted on the truck, windows are formed on the supporting frame, and the supporting assembly further comprises at least one of baffles or a storage box arranged on the windows.

18. The rear truck bed equipment according to claim 17, wherein at least one of the baffles or the storage box is movably connected to the supporting frame to move relative to the supporting frame to open or close the windows.

19. The rear truck bed equipment according to claim 12, wherein the supporting assembly comprises supporting legs, two supporting legs are provided on each of left and right sides and are inclined from the left or right to the middle respectively.

* * * * *